June 11, 1963  J. J. STEGGERDA  3,093,644
PREPARATION OF MELAMINE
Filed Aug. 17, 1962
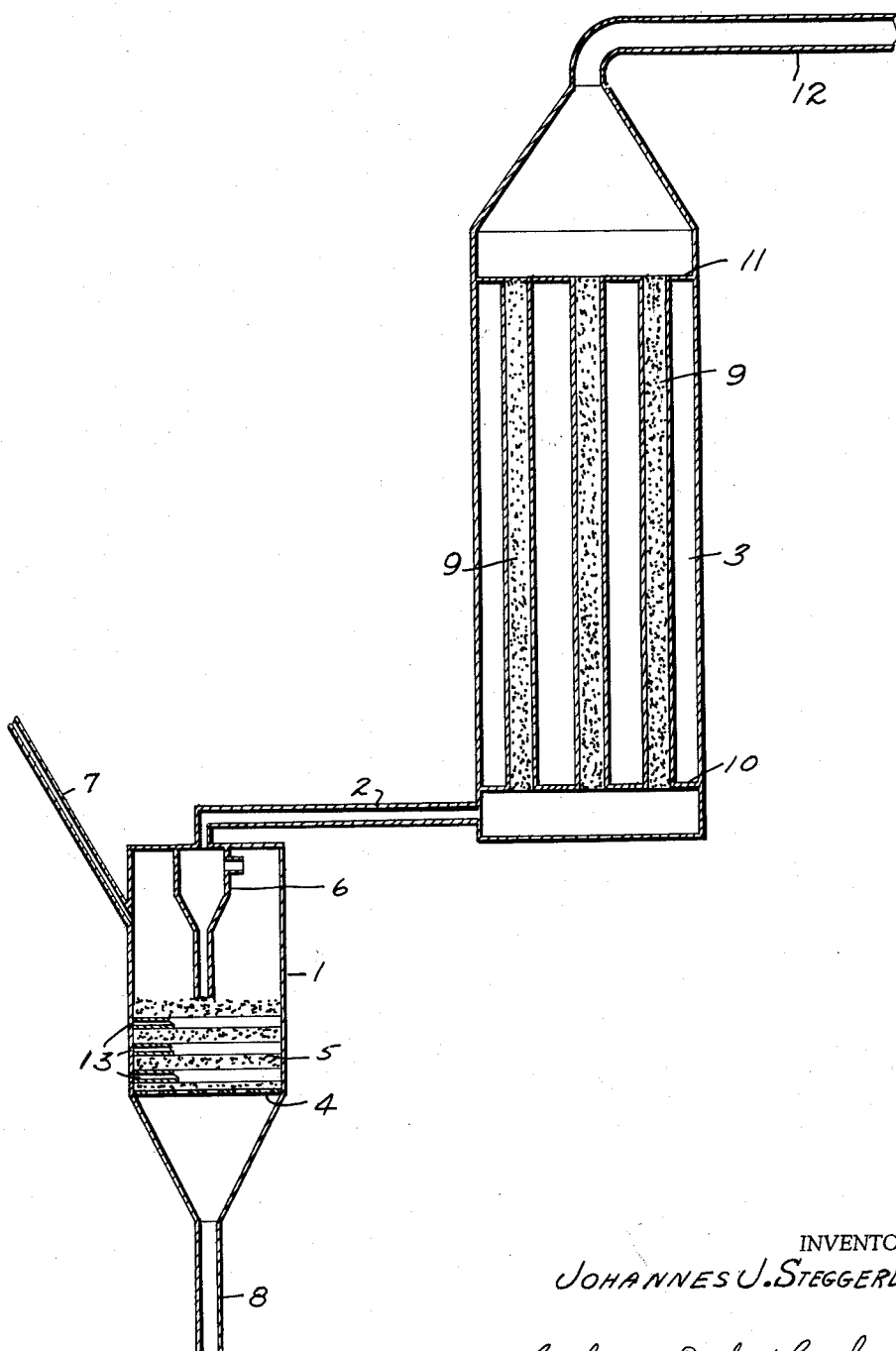
INVENTOR
JOHANNES J. STEGGERDA
BY Cushman, Darby & Cushman
ATTORNEYS

United States Patent Office 3,093,644
Patented June 11, 1963

3,093,644
PREPARATION OF MELAMINE
Johannes J. Steggerda, Geleen, Netherlands, assignor to Stamicarbon N.V.
Filed Aug. 17, 1962, Ser. No. 217,709
Claims priority, application Netherlands Apr. 2, 1959
9 Claims. (Cl. 260—249.7)

The present invention relates to an improved method of preparing melamine by heating urea and/or one of the products obtainable by thermal decomposition of urea, e.g. biuret.

It is well known that good yields of melamine can be obtained from urea or from any of the products obtainable by thermal decomposition of urea, by heating these substances at a temperature of 220–400° C., in the presence of a solid catalyst of large internal surface area, and preferably in the presence of $NH_3$ (U.S. Patent No. 2,760,961). In the abovementioned process, the urea is preferably introduced into the lower part of a fluidized bed of catalyst, the fluidized state being kept up by means of a stream of $NH_3$.

The overall reaction for preparing melamine by the method discussed above may be shown as follows:

(a)   $6CO(NH_2)_2 \rightarrow C_3N_6H_6 + 3CO_2\uparrow + 6NH_3\uparrow$

This reaction is apparently built up from two consecutive reactions:

(b)   $2CO(NH_2)_2 \rightarrow H_2NCN + 2NH_3 + CO_2$ and (c)   $3H_2NCN \rightarrow C_3N_6H_6$ and it appears that the first reaction (b) is strongly endothermic and proceeds considerably faster than the weakly exothermic second reaction (c).

It is known that in connection with the high treat-transfer coefficient obtained with a fluidized catalyst bed such a fluidized catalyst bed is considered particularly appropriate for a strongly endothermic reaction proceeding at a high temperature level.

In principle, it is therefore correct that the first reaction (b) is made to proceed in a fluidized catalyst bed. Moreover, this fluidized bed is favorable in connection with the required rapid mixing with the catalyst bed of the urea to be added as solid substance or as melt, since in the case of the much slower mixing, which takes place if a fixed catalyst bed is used, it is possible that urea does not decompose according to reaction (b) but according to reaction:

(d)   $3CO(NH_2)_2 \rightarrow C_3H_3O_3H_3 + 3NH_3\uparrow$ where lumps of cyanic acid form on the catalyst that block the passage through the bed.

It has appeared now that in a fluidized catalyst bed at a relatively high load the reaction (b) proceeds practically to completion, but the reaction (c) proceeds only to a small extent. In order that the reaction (c) may be caused to proceed to completion and consequently a larger yield of melamine may be obtained, either the load on the fluidized bed would have to be decreased or a larger fluidized bed reactor would have to be use. For the reaction (c), however, the known advantages of a fluidized bed are of no importance, since the reaction (c) has little calorific effect; a properly constant temperature is of little importance here, and no more is the satisfactory mixing of the reactants with the catalyst, since in the case of the reaction (c) the reactants are gaseous. In view of these considerations the reaction (c) should preferably take place in a fixed catalyst bed.

According to the invention, the urea or a product obtained by thermal decomposition of urea is therefore supplied to a catalyst bed kept in the fluidized state by means of a current of $NH_3$, after which the resulting vapors, together with the $NH_3$, are passed through a fixed catalyst bed.

Stated in another way, the present invention represents an improvement over the process of 2,760,961 wherein, instead of using one fluidized catalyst bed as in the patented process, two catalyst beds are used, one being fluidized and the other fixed.

The new process offers the following advantages over the process of 2,760,961:

(1) The use of a combination of a fluidized catalyst bed and a fixed catalyst bed, instead of one fluid bed, means that the fluid bed may be much smaller than if only one bed is used. Thus, in the present process, the fluid bed need contain only 5–10% of the total amount of catalyst to be used. Consequently, corrosive and erosive forces attack a much smaller and hence, less costly apparatus.

(2) Due to the use of a smaller fluid bed, catalyst wear is reduced. Less catalyst dust is formed and less catalyst need be periodically replaced.

(3) The smaller fluidized catalyst bed means that less $NH_3$ is needed to effect a suitable fluidized state of the catalyst at a given urea load. Thus good melamine conversion figures may be obtained at an $NH_3$/urea ratio as low as 1.5–5, the amount of $NH_3$ being expressed in cubic meters per hour and the amount of urea in kg. per hour. In contrast, an $NH_3$/urea ratio of, for example 9 is needed in the known process.

(4) In view of the lower cost of the smaller fluidized catalyst bed, it becomes advantageous to connect several fluidized catalyst beds to one fixed catalyst bed. In this way, if operational trouble should occur in the most sensitive part of the apparatus, viz. at the place where the supply of the starting material is effected, it is not necessary to stop the whole apparatus, as the function of the inoperative fluidized catalyst bed can be temporarily taken over by the other fluidized catalyst beds whose operation has not been affected.

(5) Due to the combination of fluid and fixed catalyst beds, a portion of the catalyst, viz. the portion contained in the fixed bed, may have a considerably larger particle diameter than is normally suitable in a fluidized catalyst bed. Thus, it has been found that the use of a catalyst in the fixed bed with a particle diameter several times, or even ten times as large as is usual in a fluid bed, can be effectively used without having an unfavorable effect on the yield.

This possibility of using particles of larger diameter means that the resistance experienced by gas flowing through the bed is smaller. This in turn means that the process is more economical from the point of view of energy.

In addition to its process aspects, the present invention also contemplates a new and improved apparatus for carrying out the process, the annexed FIGURE diagrammatically showing a longitudinal section of one form of apparatus contemplated herein.

As shown, the apparatus comprises a fluid bed reactor 1, connected to a tube reactor 3 by a conduit 2. The reactors are made of appropriate corrosion-resistant material. Both aluminum and austenitic chrome nickel steel, type V 4a, have proven to be very suitable for this purpose. The fluid bed reactor 1 comprises a grate 4 with a catalyst bed 5 resting thereon, a dust collector cyclone 6, a feed conduit 7 for feeding the starting material into the fluidized catalyst bed, and a feed conduit 8 for the supply of the fluidization gas which keeps the bed in the fluidized state. The tube reactor 3 contains a bundle of tubes 9 filled with catalyst. If desired, a coolant or a heating agent may be sent through the space between the tubes. At their top and bottom, the tubes 9 of the bundle are fixed in tube plates 10 and 11. Over the tube plate 11 is the discharge conduit 12 for the gases flowing through the reactor.

In the fluid bed 5, there are tube- or rod-shaped heating elements 13 through which a heating agent may be passed. The elements may be hollow to permit the passage of, e.g. steam, or they may be solid and serve as heating rods which are brought to a high temperature by passing an electric current through them. To counteract wear as a result of corrosion and erosion, the rods are preferably made of a hard conducting material, e.g. SiC or $MoSi_2$.

When the above described apparatus is in operation, the catalyst is kept in the fluidized state by the supply of $NH_3$ through conduit 8. Solid or liquid urea is supplied to the bed through conduit 7. The decomposition products formed from the urea together with $NH_3$ pass through the cyclone 6, catalyst dust being caught therein and returned to the fluid bed. The dedusted gases are then fed from the top of the cyclone 6 into the tube bundle 9 where further conversion takes place. A mixture of $NH_3$ and melamine vapor is discharged through conduit 12, the melamine being separated from the $NH_3$ in conventional, known manner.

The invention is illustrated, but not limited, by the following examples:

*Example 1*

Using the apparatus described above and a silica gel catalyst, the particle diameter of which was 0.25–0.50 mm. in the fluid bed, and 4 mm. in the tube bundle, in conjunction with a temperature of 350° C. in the fluid bed and a temperature of 330° C. in the fixed bed, urea was introduced through conduit 7 at the rate of 55 kg. per hour and $NH_3$ was fed through conducit 8 at the rate of 250 cu. m. per hour. The $NH_3$/urea ratio was, therefore, 4.5.

Analysis of the gas mixture discharged through conduit 12 showed that the urea fed in had been converted into melamine with a yield which amounted to 90% of that theoretically attainable.

*Example 2*

Under conditions similar to those described in Example 1, but with molten urea sprayed onto the fluid bed at the rate of 100 kg. per hour, and $NH_3$ fed in at the rate of 300 cubic meters per hour, an 85% yield was obtained in the conversion to melamine.

The procedures described in the foregoing examples were operated at atmospheric pressure. However, the invention may also be practical at elevated pressures, e.g. up to about 20 atmospheres pressure.

Other operating conditions of the process described herein may also be widely varied. Thus, for example, in lieu of the silica gel catalyst mentioned above, any of the catalysts conventionally used for converting urea or its decomposition products like biuret, to melamine may be used. Typically, this includes such catalysts of large internal surface area (e.g. 180 m.$^2$/g. or more) as activated bauxite, silica alumina catalyst.

As indicated heretofore, one of the advantages of the present process is that lower $NH_3$/urea ratios (as low as 1.5–5) may be used than heretofore possible. However, higher ratios may be used if desired. Desirably, this bed will contain from 0.1 to 1 kgram of catalyst per 1 kilogram per hour of urea. The fixed bed will usually contain from 10 to 20 times more catalyst than the fluid bed. Particle size of the catalyst in the fluid bed usually ranges from 0.1 to 0.5 mm. As indicated hertofore, the particle size in the fixed bed may be as much as ten times greater.

The process may be carried out at temperatures between about 220° C. and 450° C. The same or different temperatures may be used in the two beds. However, according to a modification of the invention herein, the amount of catalyst may be even further reduced with considerable saving in catalyst and cost of apparatus investment by varying the temperature of the fixed catalyst bed by, for example, controlling the degree of cooling in the bed. More particularly, this modification contemplates feeding the vapors from the fluidized bed at a temperature of about 350° C. into the first part of the fixed catalyst bed, allowing the temperature of this part of the fixed bed to be raised from about 350° C. to 375–425° C. by the exothermic reaction and lowering the temperature of the remaining part of the bed which is subsequently traversed by cooling so that vapors issuing therefrom again have a temperature of about 350° C. or lower, e.g. 330° C.

Stated another way, the modification described in the preceding paragraph comprises feeding the vapors from the fluidized bed into the fixed bed at a temperature of about 320–375° C., maintaining the temperature of the first part of the fixed bed which is traversed within the range of 375–425° C. by the resulting exothermic reaction, cooling the balance of the fixed bed so that it is maintained at a lower temperature not above about 350° C. and withdrawing the gases from said bed at said lower temperature.

As a typical illustration of the advantages of this last-mentioned modification, it has been found that the fixed bed need contain only 505 kg. of catalyst if the vapors from the fluidized bed enter the bottom of a fixed bed at a temperature of 350° C., and are allowed to raise the temperature in the lower part (e.g. the bottom half) of the bed to 400° C. or maintain this part of the bed at that temperature while the upper part of the bed is cooled to reduce the temperature of the bed so that the vapors leaving the same again have a temperature of 350° C. In contrast, under otherwise identical conditions, 825 kg. of catalyst are necessary for the fixed bed if this bed is kept at 350° C. throughout its mass. This means a further saving in catalyst of 38%.

It will be appreciated that the amount of the fixed bed catalyst which is operated at the raised temperature, and consequently the amount of this bed which is cooled, can be varied. As a typical example, it can be stated that from about 50% up to about 80% of the length or amount of the bed which is first traversed should be operated at the elevated range of 375–425° C. while the balance of the bed is cooled to give the desired exit temperature of 350° C. or lower for the gas issuing from the bed. Contact times are such that the gas is essentially at the same temperature as the bed at any stage of the treatment and it will be appreciated that the raios of $NH_3$ to urea or other starting material, catalyst particle size and further operating details will conform to those outlined hereinabove. The desired degree of cooling for the fixed bed may be accomplished by indirect cooling with water through tubes or coils positioned within the bed.

As will be evident, it is possible to use several series-connected fixed catalyst beds, e.g. two, instead of a single fixed bed, in carrynig out the present invention. Thus, for example, following the modification described above, the temperature in the fixed catalyst bed first traversed by the vapors may be kept at 375–425° C. and that in the next fixed catalyst bed at 350° C. or lower.

The modification involving two different sets of temperature conditions for the fixed bed or beds is illustrated by the following examples using the apparatus heretofore described:

*Example 3*

Molten urea was sprayed onto a fluidized bed of 700 kg. silica gel catalyst (particle diameter averaging between 0.25–0.50 mm.) at the rate of 100 kg. per hour. $NH_3$ gas was fed into the reactor to maintain the bed in the fluidized state at the rate of 300 cubic meters per hour. The temperature of the bed was maintained at 350° C.

Decomposition vapors and NH₃ fluidizing gas were withdrawn from the fluidized bed reactor at 350° C. and fed into the bottom of a fixed bed of 505 kg. silica gel catalyst similar to that used in the fluidized bed. The resulting exothermic reaction was allowed to heat the catalyst to a temperature varying from 375° C. up to about 425° C. through the first half of the bed. The balance of the catalyst bed was cooled so that the vapors issuing at the top of the bed were cooled to about 350° C. Analysis of these vapors showed that the urea starting material had been converted into melamine with a yield of about 94% of that theoretically attainable.

*Example 4*

Example 3 was repeated except that the fixed bed of catalyst was maintained at 350° C. throughout its mass by cooling. It was found necessary to use 825 kg. of the catalyst under these conditions to obtain a yield equivalent to that resulting from the process outlined in Example 3 where the temperature of the fixed bed was allowed to rise in the manner described.

*Example 5*

Example 3 was repeated except that, in lieu of the single fixed catalyst bed used in Example 3 above, two separate fixed catalyst beds were used in series, the vapors leaving the first such bed being fed through the second. Each of these series-connected fixed catalyst beds included about 252.5 kg. of catalyst. The first bed was kept at a temperature between 375° and 425° C., averaging about 400° C., while the second fixed bed was kept at a little below 350° C. The yield of melamine was about 94% of the theoretical amount.

This application is a continuation-in-part of my copending applications Serial No. 17,481, filed March 28, 1960, now abandoned, and Serial No. 122,625, filed July 10, 1961, now abandoned.

It will be appreciated that various modifications may be made in the invention described above without deviating from the scope thereof as set forth in the following claims.

I claim:

1. In a process for preparing melamine by heating a compound selected from the group consisting of urea and products obtainable by thermal decomposition of urea, at a temperature between about 220° and 450° C., in the presence of NH₃ gas and a catalyst of large internal surface area, the improvement which comprises providing a fluidized catalyst bed in which the catalyst is fluidized by said NH₃ gas, providing a fixed catalyst bed, maintaining both of said beds at a temperature between about 220° C. and 450° C., feeding said compound into the fluidized catalyst bed, withdrawing the resulting vapors together with NH₃ gas from said fluidized catalyst bed, then passing this mixture of gases through the fixed catalyst bed and recovering melamine from the product.

2. The process of claim 1 wherein the ratio of NH₃ in cubic meters per unit to urea in kg. per unit time is from 1.5 to 5.

3. The process of claim 1 wherein the amount of catalyst in the fixed bed is 10 to 20 times greater than the amount in said fluidized bed.

4. The process of claim 1 wherein the particle diameter of the catalyst in the fixed bed is several times greater than the particle diameter in the fluid bed.

5. In a process for preparing melamine by heating a compound selected from the group consisting of urea and products obtainable by thermal decomposition of urea, at a temperature between about 220° and 450° C., in the presence of NH₃ gas and a catalyst of large internal surface area, the improvement which comprises providing a fluidized catalyst bed in which the catalyst is fluidized by said NH₃ gas, providing a fixed catalyst bed, the amount of catalyst in the fluidized bed comprising 5 to 10% of the total amount of catalyst utilized and the particle diameter of the catalyst in the fixed bed being several times greater than the particle diameter in the fluid bed, maintaining both of said beds at a temperature between 220° and 450° C., feeding said compound into the fluidized catalyst bed, withdrawing the resulting vapors together with NH₃ gas from said fluidized catalyst bed, the ratio of NH₃ in cubic meters to said compound in kg. being between 1.5 and 5, then passing this mixture of gases through the fixed catalyst bed and recovering melamine from the product.

6. In a process for preparing melamine from a starting material selected from the group consisting of urea and thermal decomposition products thereof wherein said starting material is first passed through a heated fluidized catalyst bed using NH₃ gas as the fluidizing gas, the resulting vapors including the NH₃ fluidizing gas are then passed through a heated fixed catalyst bed and melamine is recovered from the gaseous product issuing from said fixed bed, the improvement comprising feeding the vapors from said fluidized bed into said fixed bed at a temperature of 320–375° C., maintaining the first part of the fixed catalyst bed which is traversed by said vapors at a temperature between about 375° C. and 425° C., and then cooling the balance of said fixed catalyst bed so that the vapors issuing therefrom have a temperature not in excess of about 350° C.

7. The process of claim 6 wherein said fixed catalyst bed comprises a plurality of beds connected in series, the catalyst in the first bed of said series being kept at a temperature between 375° and 425° C. and the catalyst in the other beds of said series being cooled so that the temperature of the gas issuing from the last such bed is not above 350° C.

8. In a process for preparing melamine from a starting material selected from the group consisting of urea and thermal decomposition products thereof wherein said starting material is first passed through a heated fluidized catalyst bed using NH₃ gas as the fluidizing gas, the resulting vapors including the NH₃ finishing gas are then passed through a heated fixed catalyst bed and melamine is recovered from the gaseous product issuing from said fixed bed, the improvement comprising feeding the vapors from said fluidized bed into said fixed bed at a temperature of 320–375° C., maintaining the first part of the fixed catalyst bed which is traversed by said vapors at a temperature between about 375° C. and 425° C., and then cooling the balance of said fixed catalyst bed so that the vapors issuing therefrom have a temperature not in excess of about 350° C., the first part of said fixed catalyst bed comprising from about 50% to about 80% of the total fixed catalyst bed.

9. The process of claim 6 wherein the vapors from the fluidized bed have a temperature of about 350° C.

References Cited in the file of this patent

UNITED STATES PATENTS

| | | |
|---|---|---|
| 2,760,961 | Mackay | Aug. 28, 1956 |
| 2,768,882 | Mattson | Oct. 30, 1956 |
| 2,779,777 | Mungen | Jan. 29, 1957 |
| 2,783,131 | Mackay et al. | Feb. 26, 1957 |
| 2,943,088 | Westfall | June 28, 1960 |
| 2,943,997 | MacLaren et al. | July 5, 1960 |

FOREIGN PATENTS

| | | |
|---|---|---|
| 767,344 | Great Britain | Jan. 30, 1957 |
| 32–1531 | Japan | Mar. 27, 1957 |